(12) United States Patent
Kupfer et al.

(10) Patent No.: US 6,313,076 B1
(45) Date of Patent: Nov. 6, 2001

(54) USE OF POLYMERS AS ANTIMISTING ADDITIVES IN WATER-BASED COOLING LUBRICANTS

(75) Inventors: Rainer Kupfer, Hattersheim; Karl Heinz Heier, Frankfurt am Main, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/611,017

(22) Filed: Jul. 6, 2000

(30) Foreign Application Priority Data

Jul. 6, 1999 (DE) .............................. 199 31 218

(51) Int. Cl.[7] ..................... C10M 151/00; C10M 173/02
(52) U.S. Cl. ............................................................. 508/404
(58) Field of Search ................................................ 508/404

(56) References Cited

U.S. PATENT DOCUMENTS

| | | | |
|---|---|---|---|
| 3,284,393 | 11/1966 | Vanderhoff et al. | 524/801 |
| 3,624,019 | 11/1971 | Anderson et al. | 523/336 |
| 4,536,539 | 8/1985 | Lundberg et al. | 524/521 |
| 5,510,436 | 4/1996 | Hille et al. | 526/240 |
| 5,756,430 | * 5/1998 | Zielinski | 508/275 |
| 5,783,529 | * 7/1998 | Kalhan et al. | 508/216 |
| 6,020,291 | * 2/2000 | Lange et al. | 508/404 |
| 6,100,225 | * 8/2000 | Kalhan et al. | 508/404 |

FOREIGN PATENT DOCUMENTS

| | | |
|---|---|---|
| 1 089 173 | 9/1960 | (DE) . |
| 1 301 566 | 8/1969 | (DE) . |
| 0 483 638 | 5/1992 | (EP) . |
| 0 642 571 | 7/1996 | (EP) . |
| 0 811 677 | 12/1997 | (EP) . |
| 0 921 185 A2 | 6/1999 | (EP) . |
| 841127 | 7/1960 | (GB) . |
| 2 252 103 | 7/1992 | (GB) . |

OTHER PUBLICATIONS

EPO Search Report.
Griffin, William, Journal of the Society of Cosmetic Chemist, 1950, pp. 311–326.
Bios Final Report No. 363, 22.
Macromol Chem., 1, 1947, pp. 169–198.
Fikentscher, Von H., Celluslosechemie, 13, 1932, pp. 58–64.
Derwent Patent Family Abstract for EP 0 642 571.
Derwent Patent Family Abstract for DE 1 301 566.

* cited by examiner

*Primary Examiner*—Ellen M. McAvoy
(74) *Attorney, Agent, or Firm*—Susan S. Jackson; Scott E. Hanf

(57) ABSTRACT

The invention provides for the use of copolymers containing structural units derived from the compounds of the formulae 1 and 2

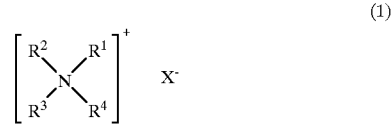

(1)

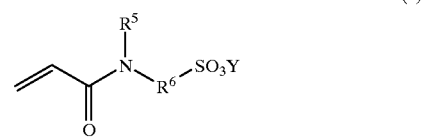

(2)

in which $R^1$ and $R^2$ independently of one another are a terminally unsaturated alkenyl radical having 3 to 5 carbon atoms, $R^3$ and $R^4$ independently of one another are $C_1$–$C_4$ alkyl, $R^5$ is H or $C_1$–$C_4$ alkyl, $R^6$ is a branched or unbranched $C_1$–$C_6$ alkylene radical, X is an anion, and Y is an alkali metal or ammonium to prevent misting in water-based cooling lubricants.

7 Claims, No Drawings

USE OF POLYMERS AS ANTIMISTING ADDITIVES IN WATER-BASED COOLING LUBRICANTS

BACKGROUND OF THE INVENTION

The present invention relates to the use of polymers containing structural units of diolefinically unsaturated ammonium cations and acrylamidosulfonic acids to suppress the misting of water-based cooling lubricants.

In metalworking, cooling lubricants are generally used in order to reduce tool wear. At the high tool or workpiece speeds involved, for example, in the cutting or grinding of metals, these lubricants may be thrown up into the environment, causing unwanted misting. The prior art has disclosed a variety of approaches to reducing this misting.

EP-A-0 811 677 discloses water-based metalworking fluids which comprise antimisting copolymers. These copolymers consist firstly of structural units derived either from acrylamidosulfonic acids or sulfonated styrene and secondly of acrylamide or acrylate structural units.

EP-B-0 642 571 discloses the use of polymers having a molecular weight of more than 1,000,000 units as antimisting additives, the polymers being selected from the group consisting of polyalkylene oxides, polyacrylamides, polymethacrylamides or acrylamide-methacrylamide-unsaturated carboxylic acid copolymers.

GB-A-22 52 103 discloses an antimisting additive comprising polymers composed of structural units derived from water-soluble acrylamides, acrylic acid and water-insoluble acrylamides.

SUMMARY OF THE INVENTION

Additives for reducing the misting in metalworking are an important aid not least for reasons of protecting the health of the persons who carry out such work.

Consequently, additives of this kind are the subject of intense research and development effort. The object on which the present invention is based is to provide additives having improved properties.

It has surprisingly been found that polymers based on diolefinically unsaturated ammonium ions and acrylamidosulfonic acids are highly effective mist suppressants.

DESCRIPTION OF THE PREFERRED EMBODIMENTS

The invention provides for the use of copolymers containing structural units derived from the compounds of the formulae 1 and 2

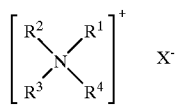
(1)

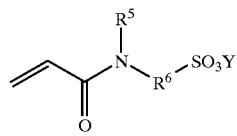
(2)

in which $R^1$ and $R^2$ independently of one another are a terminally unsaturated alkenyl radical having 3 to 5 carbon atoms, $R^3$ and $R^4$ independently of one another are $C_1$–$C_4$ alkyl, $R^5$ is H or $C_1$–$C_4$ alkyl $R^6$ is a branched or unbranched $C_1$–$C_6$ alkylene radical, X is an anion, and Y is an alkali metal or ammonium to prevent misting in water-based cooling lubricants.

The copolymer thus defined is also referred to below as antimisting additive.

The phrase "derived from" denotes in this case that the stated olefinically unsaturated compounds, in reacting, lose at least one C—C double bond and the copolymer therefore contains corresponding structural units.

The invention further provides water-based cooling lubricants comprising these antimisting additives.

$R^1$ and $R^2$ are preferably both an allyl radical. $R^3$ and $R^4$ are preferably both a methyl radical. $R^5$ is preferably hydrogen. In a preferred embodiment $R^6$ is an alkylene radical of the formula 3.

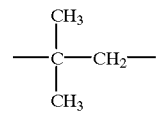
(3)

The structural unit of the formula 1 is preferably prepared by the copolymerization of diallyldimethylammonium chloride (DADMAC). The structural unit of the formula 2 is preferably prepared by the copolymerization of acrylamidopropenylsulfonic acid (AMPS).

Possible anions X are those which do not have a disruptive influence on the polymerization. Examples of anions are halides, sulfates, nitrates, carbonates and phosphates.

Preferred molecular weights (number average) of the copolymers are between 100,000 and 2,000,000, in particular from 250,000 to 1,000,000 units.

Indicators used for the molecular weight are the relative viscosity and/or the k value. To determine the k value, the copolymer is dissolved in a defined concentration usually 0.5%) and the efflux time at 25° C. is determined using an Ubbelohde capillary viscometer. This gives the absolute viscosity of the solution ($\eta_c$). The absolute viscosity of the solvent is $\eta_o$. The ratio of these two absolute viscosities gives the relative viscosity $$z = \frac{\eta_c}{\eta_o}$$

and from the relative viscosity and the concentration function the k value can be determined using the following equation:

$$Lg\, z = \left( \frac{75 \cdot k^2}{1 + 1.5 kc} + k \right) c$$

In one preferred embodiment the molar amounts of the structural units of the formulae 1 and 2 add up to 100% by weight.

In another preferred embodiment the copolymer contains from 2 to 50% by weight of the structural units derived from formula 1. In addition, the copolymer contains preferably from 50 to 98% by weight of structural units of the formula 2, in particular from 20 to 35% by weight of structural units of the formula 1 and from 65 to 80% by weight of structural units of the formula 2.

In another preferred embodiment, however, the copolymer may contain further comonomers. In another preferred embodiment of this kind the copolymer contains structural units derived from compounds of the formulae 4 and/or 5

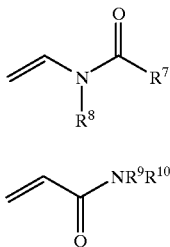

(4)

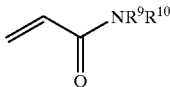

(5)

In formula (4), $R^7$ and $R^8$ are H or $C_1$–$C_4$ alkyl. In addition, $R^7$ and $R^8$, with inclusion of the —N—CO— group, may form a ring having 5, 6, 7 or 8 ring atoms. Preference is given to rings having 5, 6 or 7 ring atoms. $R^7$ and $R^8$ can include heteroatoms but preferably include only carbon atoms. In a particularly preferred embodiment, formula 4 represents a structural unit of the formula 4a.

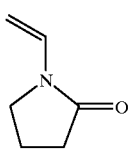

(4a)

In another particularly preferred embodiment, formula 4 represents N-vinylcaprolactam. In another particularly preferred embodiment the structural unit is of the formula 4b.

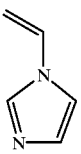

(4b)

$R^9$ and $R^{10}$ independently of one another are H or $C_1$–$C_4$ alkyl. The fraction of structural units of the formulae (4) and (5) in the copolymer is independently of one another up to 25% by weight, preferably independently of one another from 5 to 25% by weight.

In a further preferred embodiment the copolymer contains from 5 to 20% by weight of structural units derived from acrylic acid.

The copolymers of the invention can be prepared by copolymerizing compounds of the formulae (1) and (2) and, if used, (4) and/or (5). The process for preparing the copolymers is described in the prior art and is set out below.

The copolymers can be prepared by the technique of solution polymerization, bulk polymerization, emulsion polymerization, inverse emulsion polymerization, precipitation polymerization or gel polymerization. The polymerization is preferably performed as a solution polymerization in water or as a precipitation polymerization.

When carrying out the copolymerization in a water-miscible organic solvent, it is generally carried out under the conditions of precipitation polymerization. In this technique the polymer is obtained directly in solid form and can be isolated by distilling off the solvent or by filtration with suction and drying.

Suitable water-miscible organic solvents for carrying out this preparation process are, in particular, water-soluble alkanols, namely those having 1 to 4 carbon atoms such as methanol, ethanol, propanol, isopropanol, n-, sec- and isobutanol, but preferably tert-butanol.

The water content of the lower alkanols used as solvent in this case should not exceed 6% by weight, since otherwise lumps may form during the polymerization. It is preferred to operate with a water content of from 0 to 3% by weight.

To a certain degree, the amount of solvent to be used depends on the nature of the comonomers employed. In general, from 200 to 1000 g of solvent are used per 100 g of total monomers.

When conducting the polymerization in inverse emulsion, the aqueous monomer solution is emulsified in a known manner in a water-immiscible organic solvent such as cyclohexane, toluene, xylene, heptane or high-boiling petroleum fractions with the addition of from 0.5 to 8% by weight, preferably from 1 to 4% by weight, of known emulsifiers of the W/O type and this emulsion is polymerized using conventional free-radical initiators.

The principle of inverse emulsion polymerization is known from U.S. Pat. No. 3,284,393. With this technique, water-soluble monomers or mixtures thereof are polymerized with heating to give high molecular mass copolymers by first emulsifying the monomers or aqueous solutions thereof in a water-immiscible organic solvent which forms the coherent phase, with the addition of water-in-oil emulsifiers, and heating this emulsion in the presence of free-radical initiators. The comonomers to be used can be emulsified as they are in the water-immiscible organic solvent or can be used in the form of an aqueous solution containing between 100 and 5% by weight of comonomers and from 0 to 95% by weight of water, the composition of the aqueous solution depending on the solubility of the comonomers in water and on the intended polymerization temperature. The ratio between water and the monomer phase can be varied within wide limits and is generally from 70:30 to 30:70.

In order to emulsify the monomers in the water-immiscible organic solvent to give a water-in-oil emulsion, from 0.1 to 10% by weight, based on the oil phase, of a water-in-oil emulsifier is added to the mixtures. Preference is given to the use of emulsifiers having a relatively low HLB. The HLB is a measure of the hydrophobicity and hydrophilicity of surfactants and emulsifiers (Griffin, J. Soc. Cosmetic Chemists 1, (1950), 311). Substances having a low HLB of below 10, for instance, are generally good water-in-oil emulsifiers.

As the oil phase it is possible in principle to use any inert water-insoluble liquid, i.e. any hydrophobic organic solvent. In general, hydrocarbons whose boiling point lies within the range from 120 to 350° C. are used here. These hydrocarbons can be saturated, linear or branched paraffinic hydrocarbons, as are present predominantly in petroleum fractions, which may also include the customary fractions of naphthenic hydrocarbons. However, it is also possible to use aromatic hydrocarbons such as, for example, toluene or xylene, and also mixtures of the abovementioned hydrocarbons, as the oil phase. Preference is given to the use of a mixture of saturated n- and isoparaffinic hydrocarbons containing up to 20% by weight of naphthenes. A detailed description of the process is given, for example, in DE-A-1 089 173 and in U.S. Pat. Nos. 3,284,393 and 3,624,019.

Copolymers having molecular weights of more than 1,000,000 are obtained if the polymerization is conducted in aqueous solution by the technique known as gel polymerization. In that case, 15–60% strength by weight solutions of the comonomers are polymerized with known and suitable catalysts, without mechanical mixing, utilizing the Trommsdorff-Norrish effect (Bios Final Rep. 363,22; Macromol. Chem. 1, 169/1947).

Following mechanical comminution using appropriate apparatus, the copolymers prepared by this route, which are in the form of aqueous gels, can be dissolved directly in water and so used. Alternatively, they can be obtained in solid form after the water has been removed by means of known drying processes, and can be redissolved in water at the time of use.

The polymerization reactions are conducted in the temperature range between −60 and 200° C., preferably between 10 and 120° C., under either atmospheric or superatmospheric pressure. The polymerization is generally performed under an inert gas atmosphere, preferably under nitrogen.

The polymerization can be initiated using high-energy electromagnetic or corpuscular beams or the customary chemical polymerization initiators, examples being organic peroxides such as benzoyl peroxide, tert-butyl hydroperoxide, methyl ethyl ketone peroxide, cumene hydroperoxide, azo compounds such as azodiisobutyronitrile or 2'-azobis(2-amidinopropane) dihydrochloride, and inorganic peroxo compounds such as $(NH_4)_2S_2O_8$ or $K_2S_2O_8$ or $H_2O_2$ alone or in combination with reducing agents such as sodium hydrogen sulfite and iron(II) sulfate or redox systems containing as reducing component an aliphatic or aromatic sulfinic acid such as benzenesulfinic acid and toluenesulfinic acid or derivatives of these acids, such as, for example, Mannich adducts of sulfinic acid, aldehydes and amino compounds, as are described in DE-C-13 01 566. From 0.03 to 2 g of the polymerization initiator are generally used per 100 g of total monomers.

Small amounts of what are known as moderators may be added to the polymerization mixtures; these moderators harmonize the progress of the reaction by flattening the reaction rate/time plot. They therefore lead to an improvement in the reproducibility of the reaction and so enable the preparation of uniform products having a narrow molar mass distribution and high chain length. Examples of suitable moderators of this kind are nitrilotrispropionylamide or monoalkylamines, dialkylamines or trialkylamines, such as dibutylamine, for example. Such moderators may also be used with advantage in the preparation of the copolymers of the invention. Furthermore, regulators can be added to the polymerization mixtures, these regulators adjusting the molecular weight of the resultant polymers by means of targeted chain termination. Examples of known regulators which can be used are alcohols such as methanol, ethanol, propanol, isopropanol, n-butanol and amyl alcohols, alkyl mercaptans such as dodecyl mercaptan and tert-dodecyl mercaptan, isooctyl thioglycolate, and certain halogen compounds, such as carbon tetrachloride, chloroform and methylene chloride, for example.

The copolymers are added to water-based cooling lubricants in amounts of from 0.01 to 2, preferably from 0.05 to 0.5, % by weight, based on the fully formulated cooling lubricant. The composition of the water-based cooling lubricants can vary greatly. For instance, such cooling lubricants frequently include natural paraffinic, naphthenic or paraffinic-naphthenic mineral oils in addition to further additives. In addition, such cooling lubricants may comprise ester oils, fatty oil derivatives, synthetic hydrocarbons, poly-α-olefins such as polyisobutenes or polybutenes, for example, polypropylene glycol, trimethylolpropane esters, neopentyl glycol esters, pentaerythritol esters, di(2-ethylhexyl) sebacate, di(2-ethylhexyl) adipate, dibutyl phthalate and/or esters of acids containing phosphorus.

A further embodiment of cooling lubricants comprises aqueous solutions of inorganic salts such as phosphates, borates, carbonates and organic rust inhibitors such as amines, alkanolamines and substituted alkanolamines, and also their reaction products with organic and inorganic acids. Examples of such acids include natural and synthetic carboxylic acids such as caprylic acid, ethylhexanoic acid, capric acid, 2,2,4-trimethylhexanoic acid, benzoic acid, substituted benzoic acids, dicarboxylic acids having 6–22 carbon atoms, phosphoric esters, dicarboxylic monoesters or dicarboxylic monoamides, citric acid, gluconic acid, carbonic acid, phosphoric acid, polyphosphoric acids and boric acid. In addition, cooling lubricants frequently include water-soluble lubricants such as glycols and polyglycols and also ethers and esters of polyglycols, and further additives for establishing the desired properties.

Water-based cooling lubricants are described in the German Standard DIN 51385. This standard is hereby incorporated by reference into the present specification.

These base materials which make up the predominant proportion of the cooling lubricants can be supplemented by further functional additives, such as, for example, lubricity-improving additives, antiwear agents, corrosion inhibitors, antioxidants, anionic or nonionic emulsifiers, solubilizers, antifoams, biocides and/or surfactants.

To prepare a usable water-based cooling lubricant, the abovementioned base materials, the copolymers defined herein, and, if desired, functional additives are mixed with water.

In preferred embodiments the cooling lubricants of the invention contain the following ingredients:

1. 0.1–2% by weight of a compound of the formula (6)

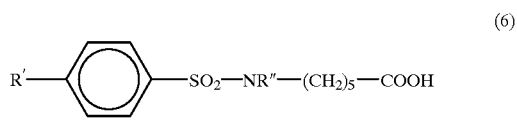

(6)

where R' and R" are H or $CH_3$ neutralized with a short-chain alkanolamine such as, for example, triethanolamine, 0.01–2% by weight of the copolymer of the invention, and water to 100% by weight; or 2. from 0.1 to 2% by weight of a compound of the formula (7)

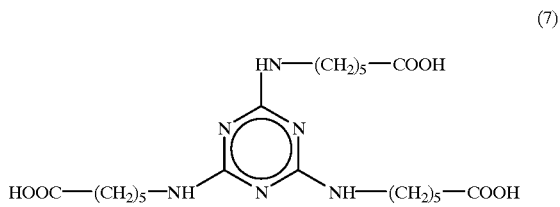

(7)

neutralized with a short-chain alkanolamine, from 0.01 to 2% by weight of the copolymer of the invention, and water to 100% by weight; or 3. from 0.1 to 2% by weight of a compound of the formula (8)

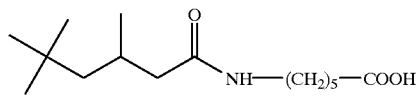

(8)

neutralized with a short-chain alkanolamine, from 0.01 to 2% by weight of the copolymers of the invention, and water to 100% by weight.

A polyalkylene glycol in an amount of from 5 to 20% by weight may added to the compositions 1., 2. and 3. This polyalkylene glycol is an EO/PO block polymer or copolymer which has lubricating properties.

EXAMPLES

In the text below, the effectiveness of the copolymers of the invention in preventing the misting of aqueous cooling lubricants is exemplified.

This effectiveness is determined using an apparatus constructed specifically for the purpose. The apparatus comprises a vessel having a height of 15 cm and a diameter of 9 cm. The test cooling lubricant is introduced into this vessel. A stream of gas (generally air) is blown into the cooling lubricant from the outside via a line which ends in a frit. The rate of the stream of gas is monitored by means of a flowmeter. The frit via which the stream of gas is blown into the vessel is positioned about 1 cm above the vessel base. 1 cm above the frit there is a disperser (Ultra Turrax T 25). When gas flows via the frit into the cooling lubricant and the disperser is switched on, a mist of cooling lubricant is produced above the surface of the liquid. The presence of this mist is visualized by means of 2 halogen lamps whose light beams extend over the surface of the liquid such that it is possible to observe the scattering caused by the mist.

During the conduct of the tests, an unadditived cooling lubricant was introduced into the vessel and the misting was observed. Then the copolymer of the invention was added in the form of a 5% strength aqueous solution until misting was no longer observed. The amount of copolymer consumed until the misting disappears is the measurement reported.

Cooling lubricant concentrates having the following composition are used (amounts in % by weight):

Cooling Lubricant Concentrate K1

| | |
|---|---|
| 6% | Genapol ® 0-050 ($C_{16}/C_{18}$ fatty alcohol polyglycol ether containing 5 EO) |
| 49.5% | Hostacor ® 4154 (alkenylsuccinic acid derivative) |
| 3% | tall oil fatty acid |
| 37% | Shell Gravex ® (mineral oil) |
| 4% | DI water |
| 0.5% | Foam Ban ® MS 455-3A (polyglycol-siloxane defoamer) |

Cooling Lubricant Concentrate K2

| | |
|---|---|
| 30% | Hostacor ® IT (compound of the formula (8) neutralized with triethanolamine) |
| 17% | triethanolamine |
| 1% | Genapol ® PF 10 (EO-PO block polymer) |
| 4% | butyl diglycol |
| 48% | DI water |

Cooling Lubricant Concentrate K3

| | |
|---|---|
| 45% | Hostacor ® IT |
| 17% | triethanolamine |
| 9% | Genapol ® B (EO-PO block polymer) |
| 1% | Genapol ® PN 30 (EO-PO block polymer) |
| 5% | butyl diglycol |
| 23% | DI water |

The above concentrates were used at a concentration of 3% in water of 20° dH [German hardness].

Composition of the Copolymers (% by Weight)

| Copolymer | DADMAC | AMPS | VIMA | NVP | k value |
|---|---|---|---|---|---|
| A1 | 25 | 75 | — | — | 183 |
| A2 | 15 | 65 | 20 | — | 162 |
| A3 | 15 | 60 | 25 | — | 158 |
| A4 | 30 | 65 | 5 | — | 169 |
| A5 | 15 | 75 | — | 10 | 181 |
| A6 | 15 | 80 | — | 5 | 148 |
| A7 | 60 | 15 | 25 | — | 152 |

The k value was determined in accordnace with Fikentscher, Cellulosechemie, 13, (1932), 58.

The results obtained are reported in the table below.

TABLE 1

Effectiveness of copolymers, amounts in % by weight of copolymer based on the weight of the cooling lubricant

| | Effectiveness in | | |
|---|---|---|---|
| Additive | K1 | K2 | K3 |
| A1 | 0.18 | 0.2 | 0.16 |
| A2 | 0.14 | 0.14 | 0.12 |
| A3 | 0.13 | 0.13 | 0.11 |
| A4 | 0.14 | 0.14 | 0.16 |
| A5 | 0.13 | 0.12 | 0.15 |
| A6 | 0.14 | 0.13 | 0.16 |
| A7 | 0.12 | 0.12 | 0.16 |
| V1 | 0.16* | 0.16 | 0.18 |

V1: Antimisting agent from Example 6 of EP-A-0 811 677
*following the addition of the stated amount there is a marked reduction in misting but not to the same extent as with the other measurements. Moreover, misting cannot be reduced by adding further amounts.

Abbreviations
  VIMA N-vinyl-N-methylacetamide
  NVP N-vinylpyrrolidone

The copolymers of the invention bring about little or no increase in the viscosity of the cooling lubricants to which they are added. They have no influence on the foaming tendency, corrosion protection properties or lubricating action of the lubricants.

The shear stability of the additived cooling lubricants was tested by subjecting them to shear in the Ultra-Turrax at 10,000 rpm for about 10 minutes, with cooling. After shearing, the antimisting effect is fully retained, which indicates that the polymers do not break down under shear.

Filtering the cooling lubricants through a Seitz deep-bed filter K300 60 DMR (pore size 5 μm, pressure filter press) likewise has no effect on their antimisting properties.

The additive treatment of cooling lubricants with the copolymers according to the invention can be carried out either on the concentrate or on the fully formulated cooling lubricant. Whereas the fully formulated cooling lubricant is always based on water, the concentrate may also be present in the form of an oil-based substance in which the copolymers are insoluble. Only in this case do the copolymers of the invention need to be incorporated into the already water-diluted cooling lubricant.

What is claimed is:

1. A process for the inhibition of misting in water-based cooling lubricants comprising adding a copolymer consisting of 20 to 35% by weight of structural units derived from a compound of formula 1 and 65 to 80% by weight of structural units derived from a compound of formula 2

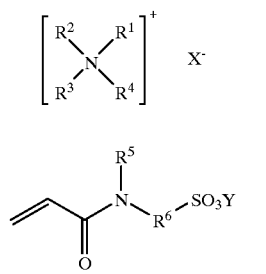
(1)

(2)

in which
$R^1$ and $R^2$ independently of one another are a terminally unsaturated alkenyl radical having 3 to 5 carbon atoms,
$R^3$ and $R^4$ independently of one another are $C_1$–$C_4$alkyl,
$R^5$ is H or $C_1$–$C_4$alkyl,
$R^6$ is a branched or unbranched $C_1$–$C_6$ alkylene radical,
X is an anion, and
Y is an alkali metal, to a water-based cooling lubricant, wherein the copolymer is added in an amount of from 0.01 to 2% by weight.

2. The process as claimed in claim 1, wherein $R^1$ and $R^2$ are an allyl radical.

3. The process as claimed in claim 1, wherein $R^3$ and $R^4$ are a methyl radical.

4. The process as claimed in claim 1, wherein $R^5$ is hydrogen.

5. The process as claimed in claim 1, wherein $R^6$ is a radical of the formula (3)

$$\begin{array}{c} CH_3 \\ | \\ -C-CH_2- \\ | \\ CH_3 \end{array} \quad (3)$$

6. The process as claimed in claim 1, wherein the copolymer has a molecular weight between 100,000 and 2,000,000 units.

7. A water-based cooling lubricant comprising, in addition to water, the customary base materials of these cooling lubricants and, if desired, functional additives, a fraction of from 0.01% to 2% by weight of copolymers as set forth in claim 1.

* * * * *